United States Patent
Chowdhary et al.

(10) Patent No.: US 10,606,283 B2
(45) Date of Patent: Mar. 31, 2020

(54) MODULAR AUTOPILOT DESIGN AND DEVELOPMENT FEATURING BAYESIAN NON-PARAMETRIC ADAPTIVE CONTROL

(71) Applicant: THE BOARD OF REGENTS FOR OKLAHOMA STATE UNIVERSITY, Stillwater, OK (US)

(72) Inventors: Girish Vinayak Chowdhary, Champaign, IL (US); Jacob Stockton, Edmond, OK (US); Hassan Kingravi, Marietta, GA (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 15/751,708

(22) PCT Filed: Aug. 15, 2016

(86) PCT No.: PCT/US2016/047099
§ 371 (c)(1),
(2) Date: Feb. 9, 2018

(87) PCT Pub. No.: WO2017/078823
PCT Pub. Date: May 11, 2017

(65) Prior Publication Data
US 2018/0239365 A1 Aug. 23, 2018

Related U.S. Application Data

(60) Provisional application No. 62/204,557, filed on Aug. 13, 2015.

(51) Int. Cl.
*G05D 1/08* (2006.01)
*B64C 13/16* (2006.01)
(Continued)

(52) U.S. Cl.
CPC .......... *G05D 1/0825* (2013.01); *B64C 13/16* (2013.01); *B64C 39/024* (2013.01); *G06N 7/005* (2013.01);
(Continued)

(58) Field of Classification Search
CPC .... G05D 1/0825; B64C 13/16; B64C 39/024; G06N 7/005
(Continued)

(56) References Cited

U.S. PATENT DOCUMENTS 5,053,969 A * 10/1991 Booth .................. G05D 1/0692
701/11
6,609,036 B1 * 8/2003 Bickford ............ G05B 23/0254
700/28
(Continued)

FOREIGN PATENT DOCUMENTS

WO 2015121169 A1 8/2015

OTHER PUBLICATIONS

Stockton "Modular Autopilot Design and Development Featuring Bayesian Non-Paremetric Adaptive Control", submitted to the Faculty of the Graduate College of Oklahoma State University in partial fulfillment of requirement for Degree of Master of Science in Dec. 2014; Published in: US.
(Continued)

*Primary Examiner* — Thomas G Black
*Assistant Examiner* — Luat T Huynh
(74) *Attorney, Agent, or Firm* — Crowe & Dunlevy; Terry L. Watt

(57) ABSTRACT

According to an embodiment, there is provided an onboard integrated computational system for an unmanned aircraft system ("Stabilis" autopilot). This is an integrated suite of hardware, software, and data-to-decisions services that are designed to meet the needs of business and research devel-
(Continued)

| Vector | roll | pitch | yaw |
|---|---|---|---|
| Angular Rates | $\omega^b$ | p | q | r |
| Velocity | $V^b$ | u | v | w |
| Forces | $F^b$ | X | Y | Z |
| Moments | $M^b$ | L | M | N | opers of UAS. Stabilis is designed to accelerate the development of any UAS platform and avionics system; it does so with hardware modularity and software adaptation. The Stabilis offers multiple technological advantages technological advantages including: Plug-and-adapt functionality; Data-to-decisions capability; and, On board parallelization capability.

17 Claims, 10 Drawing Sheets

(51) Int. Cl.
*B64C 39/02* (2006.01)
*G06N 7/00* (2006.01)

(52) U.S. Cl.
CPC .. *B64C 2201/021* (2013.01); *B64C 2201/104* (2013.01)

(58) Field of Classification Search
USPC .......................................................... 701/11
See application file for complete search history.

(56) References Cited

U.S. PATENT DOCUMENTS

| | | | |
|---|---|---|---|
| 6,917,839 B2 * | 7/2005 | Bickford | G05B 23/0275 700/30 |
| 8,761,966 B2 * | 6/2014 | Zhu | G05D 1/101 244/175 |
| 8,761,971 B2 * | 6/2014 | Gershzohn | G05D 1/101 340/971 |
| 2014/0249694 A1 | 9/2014 | Cathcart et al. | |
| 2014/0257683 A1 * | 9/2014 | Choi | G08G 5/003 701/120 |
| 2015/0064657 A1 | 3/2015 | Hales et al. | |

OTHER PUBLICATIONS

PCT/US2016/047099, Filed Aug. 15, 2016, International Search Report and Written Opinion, dated Apr. 19, 2017.

* cited by examiner

| | Vector | roll | pitch | yaw |
|---|---|---|---|---|
| Angular Rates | $\omega^b$ | p | q | r |
| Velocity | $\mathbf{V}^b$ | u | v | w |
| Forces | $\mathbf{F}^b$ | X | Y | Z |
| Moments | $\mathbf{M}^b$ | L | M | N |

MODULAR AUTOPILOT DESIGN AND DEVELOPMENT FEATURING BAYESIAN NON-PARAMETRIC ADAPTIVE CONTROL

CROSS REFERENCE TO RELATED APPLICATIONS

This application claims the benefit of U.S. Provisional Patent Application Ser. No. 62/204,557 filed on Aug. 13, 2015, and incorporates said provisional application by reference into this document as if fully set out at this point.

STATEMENT REGARDING FEDERAL SPONSORED RESEARCH OR DEVELOPMENT

This invention was made with U.S. Government support under DOE Cooperative Agreement No. DE-FE0012173 awarded by the Department of Energy. The Government has certain rights in this invention.

TECHNICAL FIELD

This disclosure relates generally to unmanned aircraft and, more particularly, to systems and methods of adaptive control of unmanned aircraft.

BACKGROUND

Over the last few decades, Unmanned Aircraft Systems, or UAS, have become a critical part of the defense of our nation and the growth of the aerospace sector. UAS have already demonstrated a positive impact in many industries such as agriculture, first response, and ecological monitoring. Recently, there has been an increasing push industry-wide for UAS platforms to perform novel tasks such as Short Take-Off and Landing, or STOL, deep stall landings, or other acrobatic maneuvers. Of course, these novel tasks cannot be completed solely with innovative vehicle design, rather a more holistic approach is required. The ability to develop novel control systems that can perform such tasks is highly limited by the computational abilities of the autopilot system on board the UAS. In general, commercial-off-the-shelf (COTS) autopilots are split between between two categories: open-source autopilots and closed-source autopilots. The latter feature low-quality hardware and unreliable software, but a low price point; whereas, the former are extremely reliable, but highly proprietary, relatively expensive, and limited in their capability to perform novel tasks. These limitations clearly restrict the ability for researchers to push the boundaries of higher functionality for UAS.

The wide range of applications of UAS mentioned above has resulted in countless mission specific Unmanned Aerospace Vehicle, or UAV, platforms. These platforms must operate reliably in a range of environments, and in presence of significant uncertainties. The accepted practice for enabling autonomously flying UAVs today relies on extensive manual tuning of the UAV autopilot parameters or time consuming approximate modeling of the dynamics of the UAV. In practice, these methods usually lead to overly conservative controllers or excessive development times. Furthermore, controllers cannot be simply transferred from one UAV to another, rather each platform must be tuned independently of the others in order to achieve the desired performance criteria. This process can be extremely costly and time consuming for companies.

To solve these problems, this thesis posits the use of adaptive control to provide an airframe-independent control algorithm. The problem is framed using past works in adaptive control and Rapid Controller Transfer (RCT). However, RCT has not been realized on fixed wing UAV platforms in the outdoor environment. The primary goal of RCT is to transfer autopilot hardware with negligible effects on the controller performance from a source system, whose dynamics are well-known, to a transfer system, whose dynamics are poorly understood. A practical example of this could be transferring an autopilot from an Aerosonde airframe, the well-known source system, to a Zaggi airframe, the unknown transfer system.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY

According to an embodiment, to address the above-described problems a Rapid Controller Transfer ("RCT") has the advantage of a significant reduction in time and cost of developing a model for a poorly understood system. An embodiment of the algorithm overcomes the need of laboriously tuning traditional PID controller parameters. An embodiment is an alternative, adaptive control method derived from a new class of data driven adaptive control algorithms. This control algorithm leverages a nonparametric, Bayesian approach to adaptation, and is used as a cornerstone for the development of an airframe-independent autopilot. The limitations of existing autopilot platforms listed above was one of the primary concerns of the author. Thus, this thesis also presents the design and evaluation of a new, open-source autopilot named, Stabilis, to address the standing limitations of current COTS autopilots.

Two aspects of an embodiment are discussed herein: (1) A control architecture is designed that extends GP-MRAC to fixed wing flight in order to perform Rapid Controller Transfer (RCT); and (2) An open architecture autopilot is designed, constructed and evaluated. This autopilot design differs from past designs in its modularity and superior computational performance.

According to an embodiment, there is provided a method of controlling a flight of an aircraft comprising the steps of: selecting at least one control parameter of said aircraft; determining a current state of said aircraft; determining a desired state of said aircraft; using said current state and said desired state to estimate a modeling error; calculating a tracking error; using said estimate of modeling error to update a Bayesian Gaussian control process; using said updated Bayesian Gaussian control process to calculate an adaptive control factor; using at least said adaptive control factor to calculate a pseudocontrol parameter for each of said at least one control parameters; and, applying each of said at least one pseudocontol parameter to the aircraft by computing a corresponding control surface deflection, thereby adjusting each of said at least one control parameters and controlling the flight of the aircraft.

According to another embodiment there is provided a method of controlling a flight of an aircraft comprising the steps of: selecting at least one control parameter of said aircraft; determining a current state of said aircraft; determining a desired state of said aircraft; using said current state and said desired state to estimate a modeling error;

calculating a tracking error; using at least said estimate of said modeling error to update a Bayesian Gaussian control process; using said updated Bayesian Gaussian control process to calculate an adaptive control factor; using at least said adaptive control factor to calculate a pseudocontrol parameter for each of said at least one control parameters; and, using an estimate of an inverse of a system dynamic of said aircraft to obtain adjustments to each of said at least one control parameters; and, applying each of said adjustments to each of said at least one control parameters the aircraft, thereby controlling the flight of the aircraft.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION

Figure 1:
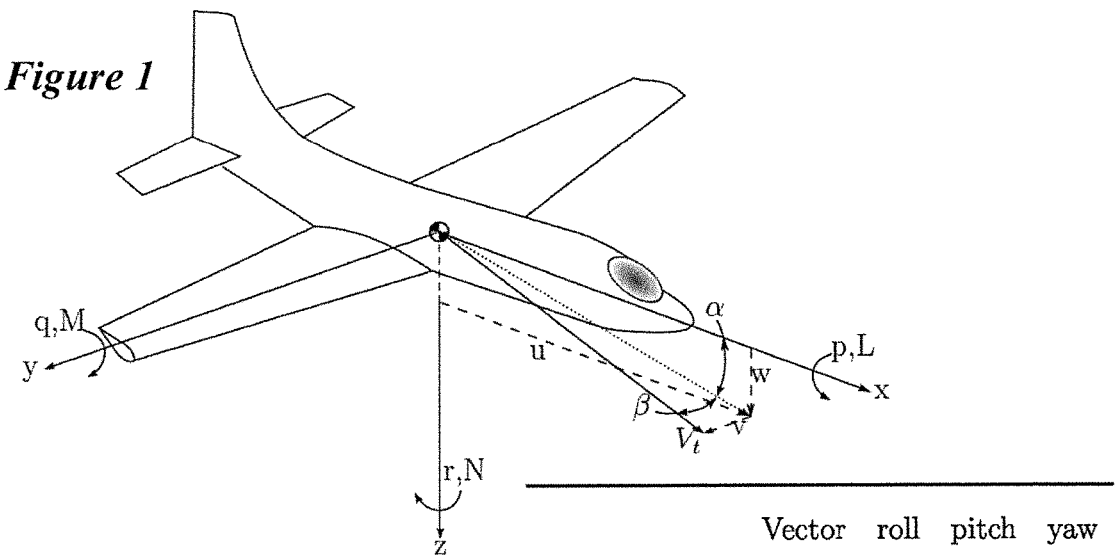
FIG. 1 contains a schematic illustration of coordinate system/catalog of variables suitable for use with an embodiment.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Aircraft Kinematics and Dynamics

Consider an aircraft, as shown in FIG. 1, with a mass moment of inertia, $I^b$, and mass, m. The mass moment of inertia is aligned with the body fixed frame denoted with the superscript, $(\bullet)^b$. Note the x-axis of the body fixed frame points out the nose of the aircraft, the y-axis is directed out of the starboard wing of the aircraft, and the z-axis is oriented downward, normal to the x and y axes. The origin of the body fixed frame is the aircraft center of mass. See, FIG. 1.

Let the position of the aircraft with respect to the origin of the body fixed frame be described using the navigational frame denoted with the superscript, $(\bullet)^n$. The attitude of the vehicle is described using Euler angles defined as, $EA=[\phi\ \theta\ \psi]$. The translational kinematics of the aircraft in the navigational frame are related to the body fixed frame by Euler angles $$\dot{p}^n = \frac{d}{dt}(R_b^n p^b) = R_b^n V^b$$

where, $\dot{p}^n = [\dot{p}^n\ \dot{p}^e\ \dot{p}^d]^T$ and, $$R_b^n = \begin{bmatrix} C_\theta C_\psi & S_\phi S_\theta C_\psi - C_\phi S_\psi & C_\phi S_\theta C_\psi + S_\phi S_\psi \\ C_\theta S_\psi & S_\phi S_\theta S_\psi + C_\phi C_\psi & C_\phi S_\theta S_\psi + S_\phi C_\psi \\ -S_\theta & S_\phi C_\theta & C_\phi C_\theta \end{bmatrix}.$$

Note that in the previous equations, $S_\theta = \sin(\theta) \cos(\phi)$, and so on. The relation of the body fixed angular rates to inertial frame angular rates is:

$$\begin{bmatrix} \dot{\phi} \\ \dot{\theta} \\ \dot{\psi} \end{bmatrix} = \begin{bmatrix} 1 & S_\phi \tan\theta & C_\phi \tan\theta \\ 0 & C_\phi & -S_\phi \\ 0 & S_\phi \sec\theta & C_\phi \sec\theta \end{bmatrix} \begin{bmatrix} p \\ q \\ r \end{bmatrix}$$

The relationships for the translational and rotational kinematics above can be used to express Newton's second law in the navigational frame. The equations of translational and angular dynamics of a 6 degree-of-freedom rigid body are given by:

$$\sum_i F_i = m\ddot{p}^n = g^n + R_b^n m a^b$$

$$\dot{\omega}^b = (I^b)^{-1}(M^b - \omega^b \times I^b \omega^b);$$

where, $g^n=[0\ 0\ g]^T$ is the navigational frame gravity vector, and $a^b=[\dot{u}\ \dot{v}\ \dot{w}]^T$ is the body fixed accelerations. The previous equations can be expanded and written in terms of the body frame as $$\begin{bmatrix}\dot{u}\\\dot{v}\\\dot{w}\end{bmatrix}=\begin{pmatrix}-g\sin\theta\\-g\sin\phi\cos\theta\\-g\cos\phi\cos\theta\end{pmatrix}+\frac{1}{m}\left[\begin{pmatrix}F_T\\0\\0\end{pmatrix}+\begin{pmatrix}X\\Y\\Z\end{pmatrix}\right]-\begin{bmatrix}qw-rv\\ru-pw\\pv-qu\end{bmatrix}$$

$$\begin{bmatrix}\dot{p}\\\dot{q}\\\dot{r}\end{bmatrix}=(I^b)^{-1}\left(\begin{bmatrix}L\\M\\N\end{bmatrix}^b-\begin{bmatrix}p\\q\\r\end{bmatrix}^b\times I^b\begin{bmatrix}p\\q\\r\end{bmatrix}\right);$$

where, $F^b$ and $M^b$ are given by the aerodynamic forces on the aircraft. The aerodynamic forces are primarily dependent on the angle of attack, $\alpha$, and side slip, $\beta$, in steady states. However, the body fixed angular rates can significantly change the aerodynamic forces as shown in the equations that follow:

$$\begin{pmatrix}X\\Y\\Z\end{pmatrix}=\begin{pmatrix}C_X(\alpha,\beta)\\C_Y(\beta)\\C_Z(\alpha)\end{pmatrix}QS$$

$$\begin{pmatrix}L\\M\\N\end{pmatrix}=\begin{pmatrix}C_L(\delta_a,\beta,\tilde{p},\tilde{r})QSb\\C_M(\delta_e,\alpha,\tilde{q})QSc\\C_N(\delta_r,\beta,\tilde{r})\end{pmatrix};$$

where $\tilde{p}=\frac{bp}{2V_t},\ \tilde{q}=\frac{\bar{c}q}{2V_t},\ \tilde{r}=\frac{br}{2V_t}$.

Since body fixed forces and moments are functions of multiple variables, they are the most complex part of the aircraft to be modeled. Usually, linear approximations are used for aerodynamics forces.

Gaussian Processes

A Gaussian process ("GP") is a supervised learning technique, which addresses the problem of mapping an input to a corresponding output given a set of data. The applications for supervised learning are practically endless. Supervised learning techniques utilize a set of training data, D, which is usually a set of observations or empirical data, $D=\{(x_i,y_i)|I=1,\ldots,n\}$. Supervised learning techniques are inductive in nature, in that, the objective is to make predictions for an input, say $x^*$, that is not included in the training set.

In order to make an accurate prediction about an input that is not included in the data set, there must be some kind of assumption about the underlying function. Supervised learning techniques generally correspond to inference utilizing either parametric or nonparametric models; in the first case, the structure of the model or predictor is assumed to be known (for instance, it is assumed to be linear, quadratic, etc. in the input), and the parameters associated to the model are inferred from the data. In the second case, the structure of the predictor is inferred from the data itself, which makes the predictor more flexible, although more expensive to compute. GP regression is an example of the second class of techniques.

GPs are in the class of Bayesian nonparametric methods. In a GP, the prior is placed on a function space, specifically, on functions contained in a Reproducing Kernel Hilbert Space, or RKHS. Here the prior encodes the "prior belief" of what class of functions the predictor belongs to. The actual, unknown function is a point in the RKHS. Consider the case of RCT, where there exists significant uncertainty between aircraft dynamics. It is desirable to predict the dynamical uncertainty using a set of discretely sampled state measurements $Z_t=z_1,\ldots,z_t$, where t is the current measured state, and there exists an inherent extent of noise for all $z\in Z$. Z such that a covariance matrix is defined by the indexed sets, $K_{ij}=k(z_i,z_j)$. Let the uncertainty, which will be furthered defined in Section 2.3.1, be denoted as, $\Delta$; where $\Delta(\bullet)\in R$. for ease of exposition. When modeled using a GP, $$\Delta(\bullet)\sim\mathcal{GP}(m(\bullet),k(\bullet,\bullet));$$

where $m(\bullet)$ is the mean function of the Gaussian process, and $k(\bullet,\bullet)$ is a real-valued positive definite covariance kernel function. The covariance kernel function operates on Z such that a covariance matrix is defined by the indexed sets, $K_{ij}=k(z_i,z_j)$. The most popular choice of kernel matrix, is the Gaussian radial basis function, $$k(z,z')=\exp\left(-\frac{\|z,z'\|^2}{2\mu^2}\right).$$

It will be assumed for purposes of this embodiment that the GP prior has a zero mean, that is, $\Delta(z_i)=m(z_i)+\varepsilon_i$, where $\varepsilon_i\mathcal{N}(0,w_n^2)$, where $\mathcal{N}(\bullet,\bullet)$ indicates a normal distribution with the indicated mean and variance. The posterior is not restricted to zero mean. Given a new measured state value, $z_{t+1}$, the joint distribution of the data under the prior distribution is $$\begin{bmatrix}y_t\\y_{t+1}\end{bmatrix}\Box\mathcal{N}\left(0,\begin{bmatrix}K(Z_t,Z_t)+\omega^2 I & k(Z_t,z_{t+1})\\k(Z_t,z_{t+1}))^T & k(z_{t+1},z_{t+1})\end{bmatrix}\right).$$

The posterior distribution is obtained using Bayes law, and by conditioning the joint Gaussian prior distribution over the observation, $z_{t+1}$ $$p(y_{t+1}|Z_t,z_{t+1})\sim\mathcal{N}(\hat{m}_{t+1},\hat{\Sigma}_{t+1});$$

where, the mean and the covariance are respectively estimated by $$\hat{m}_{t+1}=[(K(Z_t,Z_t)+\omega^2 I)^{-1}y_t]^T K(z_{t+1},Z_t)$$

$$\hat{\Sigma}_{t+1}=k(z_{t+1},z_{t+1})-K(z_{t+1},Z_t)^T(K(Z_{tau},Z_t)+\omega^2 I)^{-1}K(z_{t+1},Z_t).$$

RCT requires the prediction of uncertainty be done online, as the controller has no foreknowledge of the uncertainty that exists between the aircraft. However, the measurement vector $Z_t$ and observation set grow quickly over time. This makes these computations intractable over time. Clearly, a modification to traditional GP regression is needed that makes GP regressions possible for MRAC.

Online Learning Using Gaussian Processes

As mentioned previously, calculations associated with traditional GP regressions quickly become intractable for larger data sets, since the method scales as $O(n3)$, where n is the number of data points. Csato developed a method that utilizes rank 1 updates for the weight vector $\alpha$ and covariance. Additionally, a budget can be implemented to retain a limited number of measurement values in $Z_t$. This subset of available measurements used to is called the basis vector set, BV. The implementation of rank 1 updates while budgeting BV allows for real time uncertainty modeling. Not every measurement is useful for prediction. Thus, BV will be restricted using a linear independence test, given below to determine the novelty of incoming data.

$$\gamma_{t+1} = K(z_{t+1}, Z_t) - k(z_{t+1}, z_{t+1}) \alpha_t$$

where, $\gamma_{t+1}$ is a scalar. There are two schemes used to determine which point in BV is retained, oldest point method, OP, and KL divergence method, KL. For OP, provided that $\gamma_{t+1}$ is greater than some user specified tolerance, the data point is retained in BV and the oldest point is discarded. Although this method is less computationally intensive, the retention of a new measurement in BV may come at the cost of discarding a more useful measurement for prediction. Thus, researchers have found that the KL method performs significantly better in the context of flight controllers. The KL divergence method employs Csato's sparse online Gaussian process to efficiently approximate the KL divergence. For the specifics concerning this method, readers are referred to L. Csato and M. Opper, "*Sparse on-line gaussian processes*," Neural computation, vol. 14, no. 3, pp. 641-668, 2002, the disclosure of which is fully incorporated herein as if set out at this point.

Aircraft Guidance

Although there has been extensive research in trajectory tracking, most real world applications involve navigating between, or orbiting around, waypoints. Furthermore, time-parameterized trajectories are typically not robust due to environmental interactions and physical limitations of the transfer system. Thus, this work utilizes waypoint-based guidance methods. In practice, waypoints are provided to the aircraft as geodetic coordinates through the ground station user interface. Guidance methods in the following sections utilize the navigational frame; conversion from geodetic coordinates to the navigational frame are known. Consider the problem of navigating through n waypoints in an environment without obstacles. Let the waypoints be given in the navigational frame as, $WP_i^n$, where $i \in N$ and i represents the current waypoint. Furthermore, let the aircraft position be $p^n$, the desired path, $q^n$, and the UAS location relative to the current waypoint, $r^n$. Hence, $$q^n = WP_{i+1}^n - WP_i^n u^n = p^n - WP_i^n.$$

$$u^n = p^n - WP_i^n.$$

Then, the path tracking error can be found by taking the vector rejection of the actual and desired path vectors by $$\mathcal{A}(L_1, L_2) := \{L_1 - L_2 + 2\pi n \mid n \in I\} e_p = \begin{pmatrix} e_{p_x} \\ e_{p_y} \\ e_{p_z} \end{pmatrix} = u^n - (u^n \cdot \hat{r})\hat{r};$$

where $\hat{r} = \dfrac{r^n}{\|r^n\|}$.

In order to follow the path, the UAS must minimize the error in the lateral direction known as crosstrack error, $e_{p_{xy}}$, as well as the longitudinal error dictated by the altitude of the aircraft, $e_{p_z}$. The sign of the crosstrack error is determined by the angle given by $$\mathcal{A}(\angle_1, \angle_2) := \{\angle_1 - \angle_2 + 2\pi n \mid n \in I\} \ni |\mathcal{A}(\angle_1, \angle_2)| \leq \pi|\}$$

where, $\angle_1 = \angle r_{xy}$ and $\angle_2 = \angle p_{xy}$. The magnitude of the crosstrack error is determined by the north and east elements of the vector $e_p$. Thus, $$e_{p_{xy}} = \text{sign}(\mathcal{A}(\angle r_{xy}, \angle p_{xy})) \|e_p(1,2)\|.$$

The guidance method must also encompass some type of switching mechanism to advance the directive of the aircraft to the next waypoint provided the current waypoint is reached. The simplest and most common is the distance method, which states that the waypoint will be switched when the distance between the desired waypoint and the aircraft is less than the tolerance, $\varepsilon$. Thus, the waypoint is switched provided that $$\|p^n - WP_{i+1}^n\| \leq \varepsilon$$

Alternatively, the waypoint can be switched when the UAV enters the half plane between the segments a and b; where, $a = WP_i^n - WP_{i-1}^n$ and, $a = WP_{i+1}^n - WP_i^n$. Empirical tests between the methods dictated that the half-plane method yielded better waypoint tracking performance.

Control Design

Figure 2:
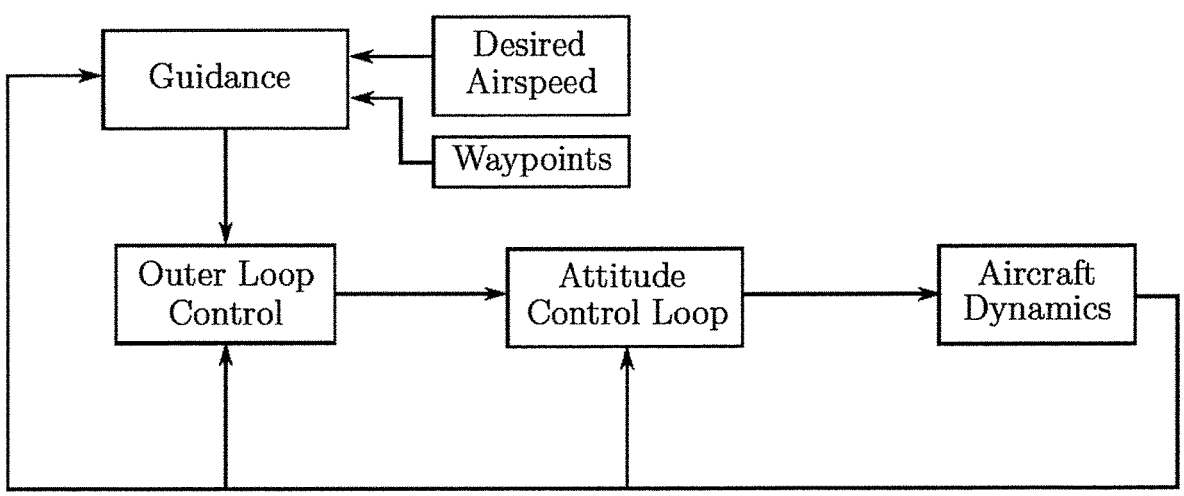
FIG. 2 contains a schematic illustration of control loop closure for an embodiment.

The most widely used method in autopilot control design is the successive closure of control loops to achieve a desired inertial position and attitude. Successive loop closure, in most cases, uses the assumption that the dynamics of the aircraft, both longitudinal and lateral are decoupled. This assumption is widely utilized, and allows for simplification of the autopilot control schemes. In FIG. 2, the loop closure design is shown. In order to keep the dynamics of each loop sufficiently decoupled, the bandwidth of each loop must be sufficiently smaller as one moves from the outer loop design to the inner loop design. The differences in bandwidth will vary due to the application, but authors have had success with variance by a factor of 5 to 10 between each loop.

Rather than taking a traditional successive loop closure design shown in FIG. 2, this implementation takes a more "human based" approach to flight. Essentially, altitude is commanded using the available control input directly, rather than relying on simplifying assumptions required for successive loop closure. We are able to do this largely because the GP can sufficiently model the coupling between inner and outerloop dynamics. Unlike the indoor flight environment, precise position and attitude measurements are not available when using modern MEMS inertial sensors. Thus it is convenient to turn to the following assumption.

Assumption 2.1 Sufficiently Accurate Estimates of $\phi$, $\theta$, and $\psi$ are Available for Control.

This assumption can be satisfied by utilizing a good inertial navigation system that fuses together inertial and absolute reference (such as GPS) measurements to reliably estimate attitude. Empirical results in flight test dictated that longitudinal motion proved to be more sensitive to controller parameters. Thus, this thesis demonstrates the viability of GP-MRAC in longitudinal motion. However, a parallel formulation is provided for fixed-wing lateral motion using the crosstrack error as the reference system. This formulation is given in Appendix A for reference.

GP-MRAC in Longitudinal Motion

Interested readers are referred to the Master of Science thesis by Jacob Stockton identified below for a rigorous exposition of proofs for the stability of GP-MRAC that directly relate to this work, the disclosure of which thesis is full incorporated herein as if set out at this point. The results of which, dictate that GP-MRAC is an exponentially mean square ultimately bounded controller in the context of AMI-MRAC. Furthermore, let $\delta_e(t) \in D_{\delta_e} \in R^n$ be bounded for all $t \subset R^+$. According to the present embodiment, the following assumption must hold for both the source and the transfer system:

Assumption 2.2 for All $\delta_e(t) \in D_{\delta_e}$ There Exists a Finite Value B>0 Such That $|q(t)| < B$.

Since UAS are required to be piloted remotely, the vast majority of fixed-wing UAS are designed to be dynamically and statically stable, and therefore, satisfy this assumption de facto. An inner loop controller must be used to provide baseline stability, provided that Assumption 2.2 does not hold. The dynamics of the source and transfer system must be defined. To this end, let $z=[\alpha \ \theta \ q \ \dot{h}^T \ \delta_e]^T$. It is assumed that for both systems the outer loop states for the longitudinal direction can be modeled by the following differential equation, $$\dot{h}_1(t)=h_2(t)$$

$$\dot{h}_2(t)=f(z(t))+b(z(t))\delta_e$$

The function $f$ is assumed to be Lipschitz continuous in $z, \dot{z} \in D_z$ and the systems are assumed to be finite input controllable. This assumption is validated, in part, by rearranging Equation 2.4. The altitude dynamics can be written as $$\ddot{h}=g-\sin \theta \ \dot{u}+\sin \phi \cos \theta \ \dot{v}+\cos \phi \cos \theta \ \dot{w},$$

where, $[\dot{u} \ \dot{v} \ \dot{w}]=[X \ Y \ Z]/m$, and the body fixed forces are given by 2.8. The following assumption characterizes the controller on the system [28]:
Assumption 2.3 for the Source and Transfer System, there Exists a Control Law $g:D_z \rightarrow D_\delta$ Such that $\delta_e(t)=g(z,\ddot{h}_{rm})$ Drives $h \rightarrow h_{rm}$ as $t \rightarrow \infty$. Furthermore, the Control Law is Invertible w.r.t. $\delta_e$, Hence the Relation $\ddot{h}_{rm}=g^{-1}(z,\delta_e)$ Holds.

A goal of MRAC based methods is to design a control law such that h converges to $h_{rm}$ satisfactorily. In the case of AMI-MRAC, feedback linearization of the system is achieved by identifying the pseudo-control, $v(t) \in R$, that achieves the desired acceleration. Provided that the system dynamics were known and invertible, the control input could be easily found as $\delta=f^{-1}(v,b,t)$. However, in the case of RCT, the plant dynamics are extremely poorly understood. Thus, an approximate model must be used which, in practice, is could be a previous vehicle if the control system is implemented on or moved to another aircraft. The use of an approximate model, $\hat{f}(z)+\hat{b}(z)\delta$ leads to modeling error $\Delta$; where delta is defined $$\Delta(z)=\dot{h}_2(t)-v(z)$$

A designer reference model is used to characterize the desired system response. In the case of straight path tracking, the positional input translates to a ramp input. Standard reference models include second order systems or the second time derivative of a time-parameterized trajectory polynomial. The former results in steady state error, whereas the latter is not used in this work for reasons discussed above. Thus, a more appropriate reference model selection would be a PID reference model. Then the feedforward term of reference model is given by $$\ddot{h}_{rm}(t)=K_p e_h + \int_a^b e_h(\tau) d\tau$$

where $e_h=h-h_{cmd}$ and $\dot{e}_h=\dot{h}-\dot{h}_{rm}$. Here, $h_{cmd}$ is given by the path between waypoints, q, and $\dot{h}_{cmd}=q_d/\sqrt{q_n^2+q_e^2}V_g \cos(\chi-\chi_q)$. The reference model states $\dot{h}_{rm}$ and, $h_{rm}$ are given by integrating $\ddot{h}_{rm}(t)$ for some initial conditions $\dot{h}_{rm0}$ and $h_{rm0}$. The tracking error is defined as, $e_t=h_{rm}-h$, and the pseudo-control, v to be $$v=v_{rm}+v_{pd}-v_q-v_{ad}.$$

where, $v_{rm}=\ddot{x}_{2rm}$, $v_{pd}=[K_1 \ K_2]e_t$ and the robustifying term $v_q=q$. The adaptive term, $v_{ad}$ is tasked with canceling the uncertainty $\Delta(z)$. Thus, the existence and uniqueness of a fixed point solution to $v_{ad}=\Delta(z)$ is assumed; results dictate that the sign of control effectiveness derivative must be the same for both systems, $$\text{i.e., i.e., } \operatorname{sgn}\frac{\partial g}{\partial \delta_s} = \operatorname{sgn}\frac{\partial g}{\partial \delta_t}.$$

It was alluded to above that the uncertainty of the dynamical system could be predicted using a draw from a GP. Thus, $v_{ad}$ is modeled $$v_{ad}(z) \sim GP(\hat{m}(z), k(z,z')).$$

Rather than drawing the adaptive element strictly from the distribution in 2.28, the adaptive element is set equal to the GP mean output. The simulation results below required the GP to model the dynamic uncertainty in the outer loop based upon the input vector z, which included both inner and outer loop states. Practically speaking, it can be costly and difficult to measure the aerodynamic angles included in the vector z. Accordingly, simulations were run that excluded the aerodynamic angles from the results. The tracking performance for both cases was remarkably similar, varying only by 1-3% depending on the aircraft. Although this is not entirely intuitive, the performance is largely attributed to the GP's ability to model the coupling between inner and outer loop dynamics.

Simulation Results

Two aircraft were chosen with largely different dynamics and different configurations: the boom-tailed Aerosonde and the flying wing Zaggi. Viability of the controller for fixed-wing aircraft is shown for the longitudinal direction only, although other configurations are possible. The aerodynamic models for the aircraft were taken from R. Beard, *Small Unmanned Aircraft Theory and Practice*, Princeton University Press, 2012, the disclosure of which is incorporated fully herein as if set out at this point. The same PD gains were used for both aircraft ([Kp Kd]=[1:2:2]). The GP was preallocated a budget of 25 active bases; where, the tolerance $\varepsilon=0.0001$ and the RBF kernel bandwidth $\mu=0.5$.

Figure 3:
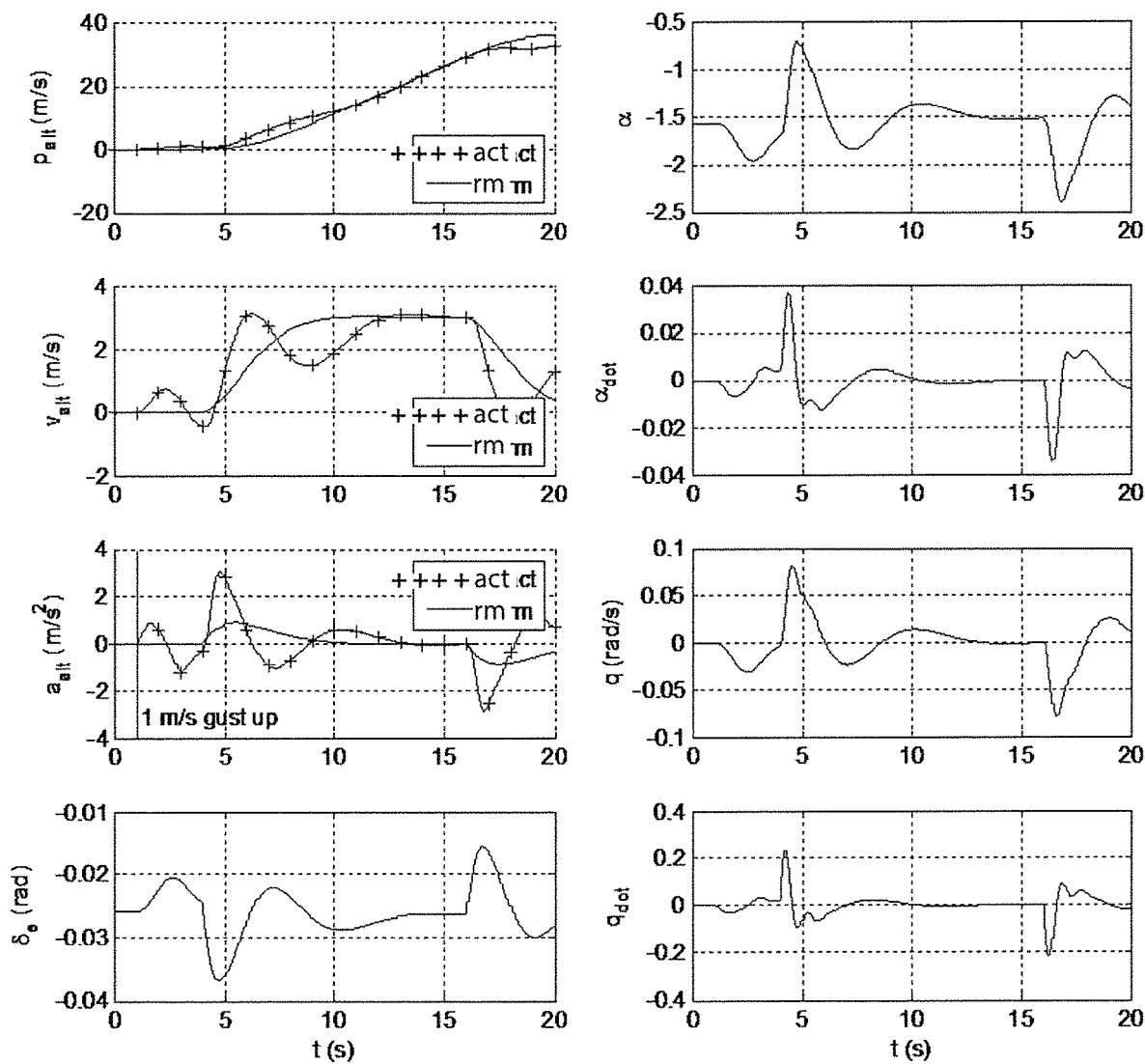
FIG. 3 contains a schematic illustration of an outer loop control of Aersonde aircraft without G-MRAC.
Figure 4:
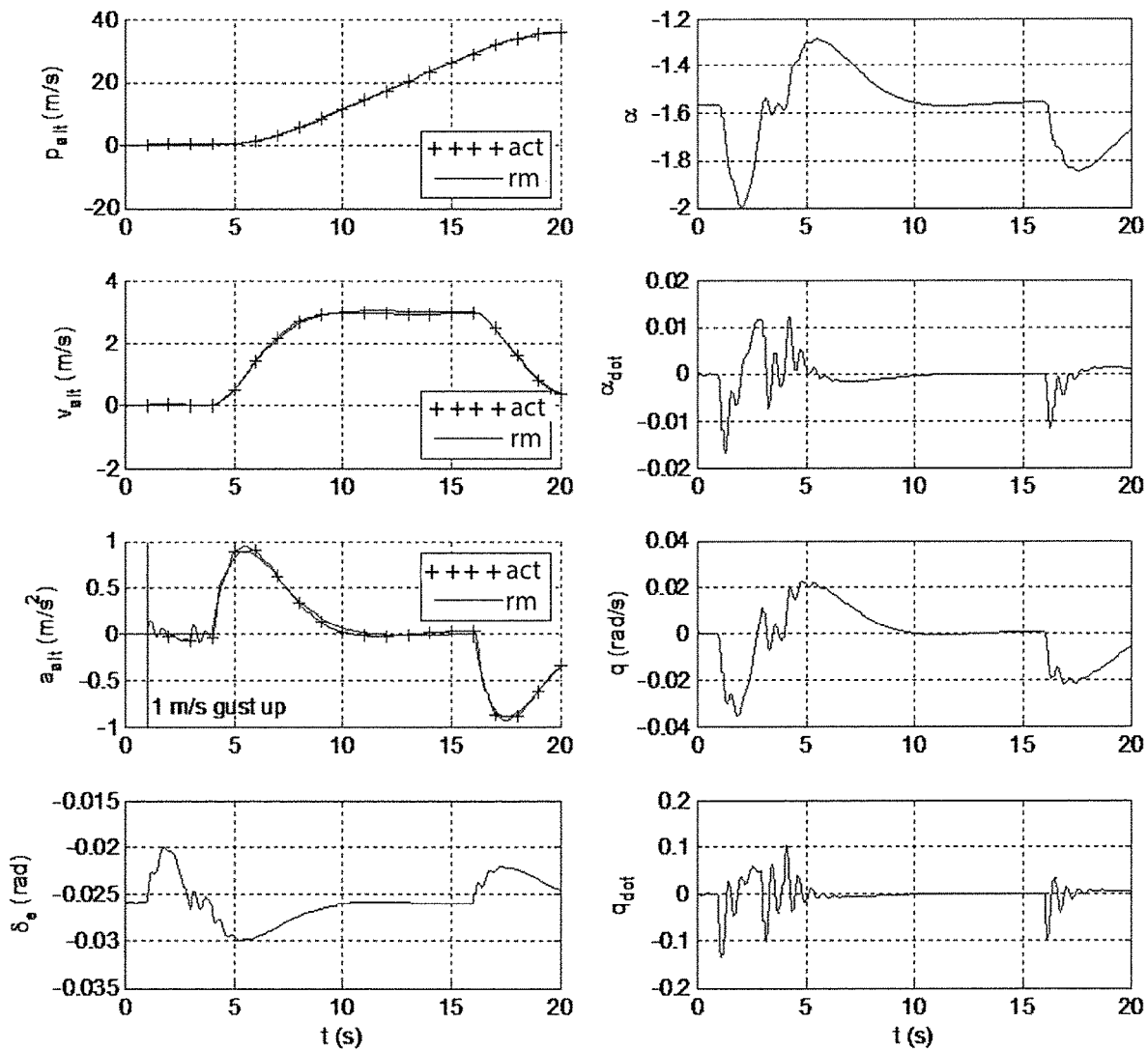
FIG. 4 contains a schematic illustration of an outer loop longitudinal control of Aersonde aircraft with GP-MRAC.
Figure 5:
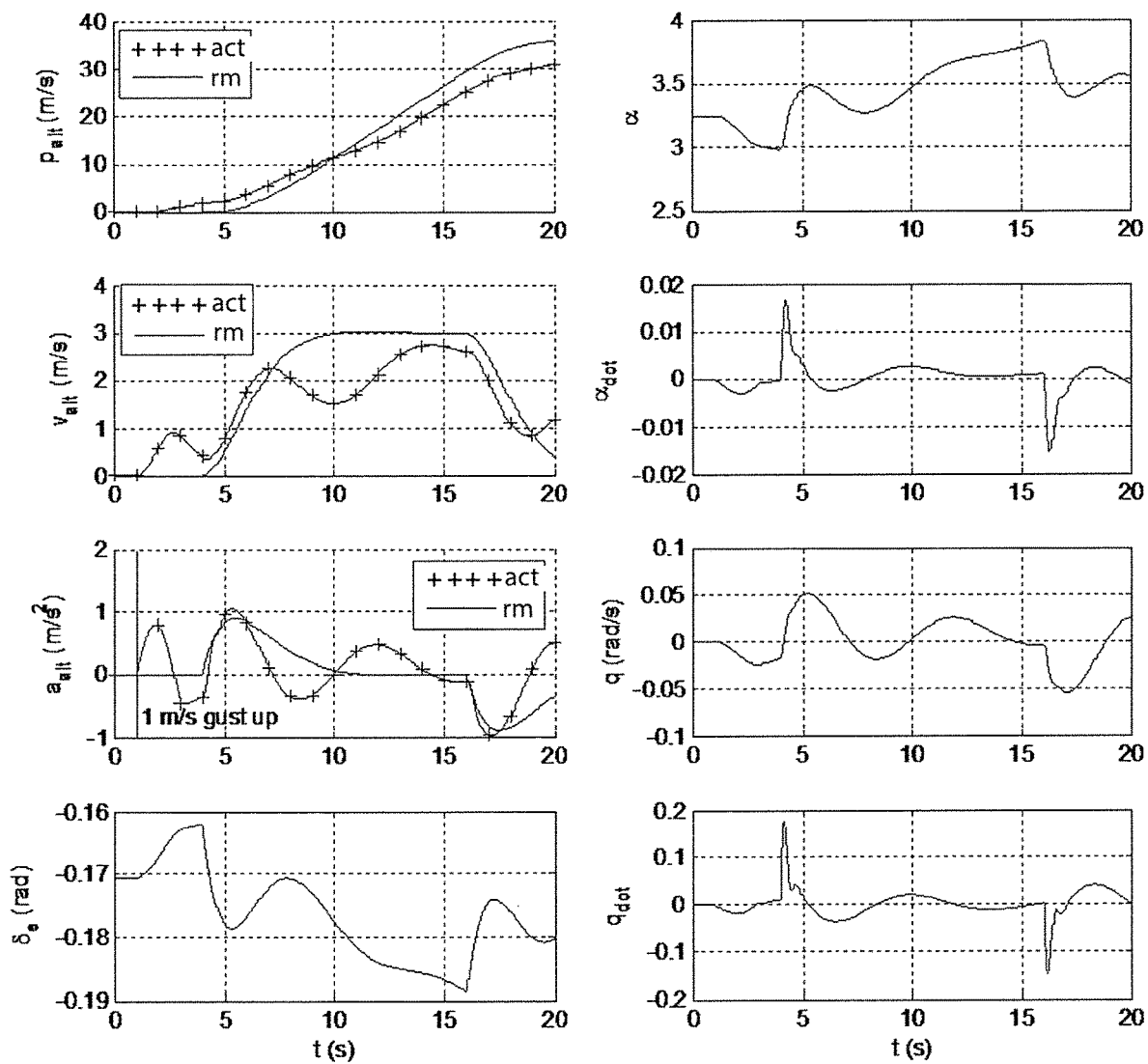
FIG. 5 contains a schematic illustration of an outer loop longitudinal control of Zaggi aircraft using the same gains parameters as the Aerosonde aircraft.
Figure 6:
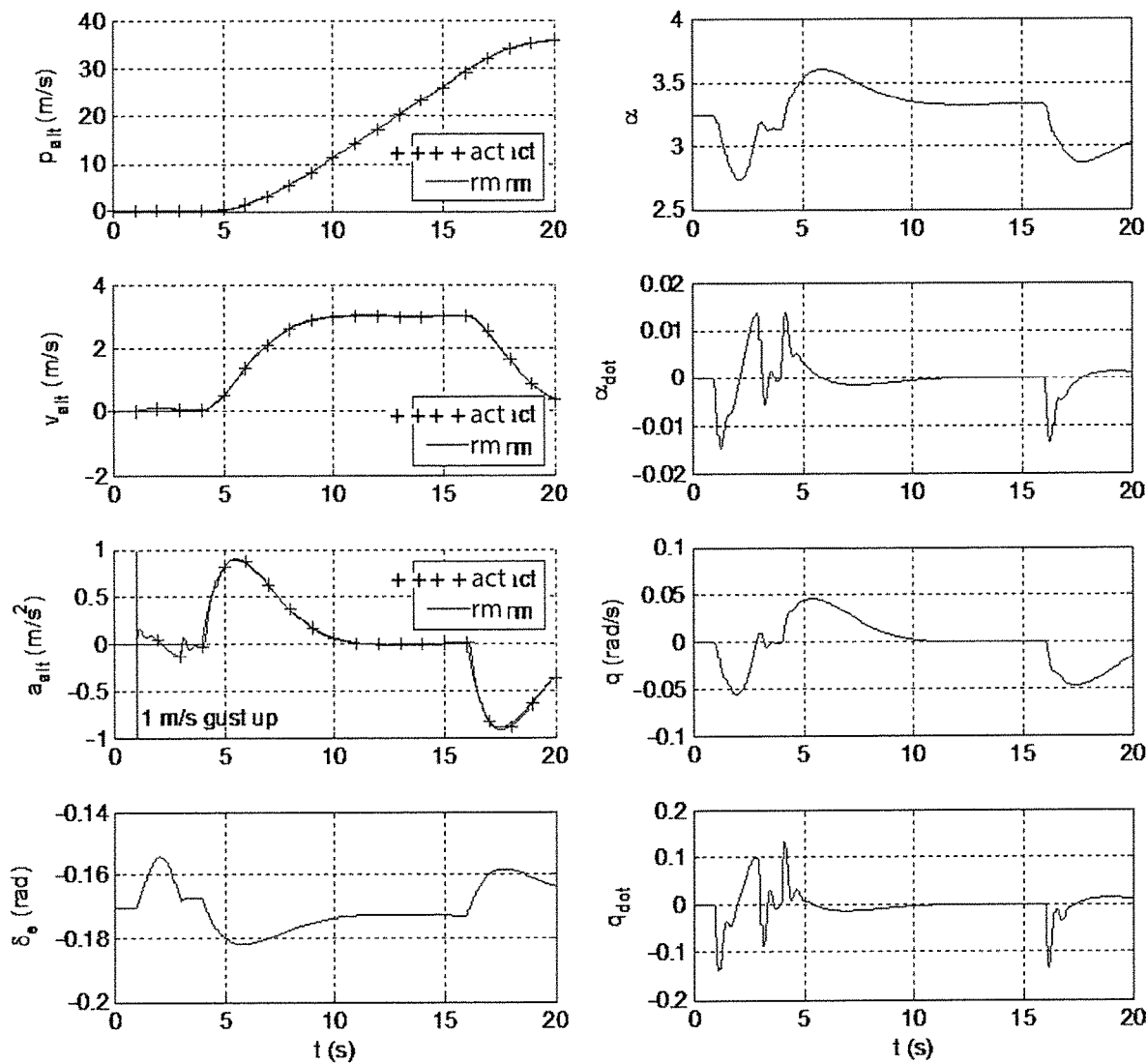
FIG. 6 contains a schematic illustration of an outer loop longitudinal control of Zaggi aircraft with GP-MRAC. Uncertainty between the aircraft dynamics is learned quickly enhancing the controller performance and allowing for the proper path tracking. Wind gust disturbance is introduced at t=1 second.
Figure 7:
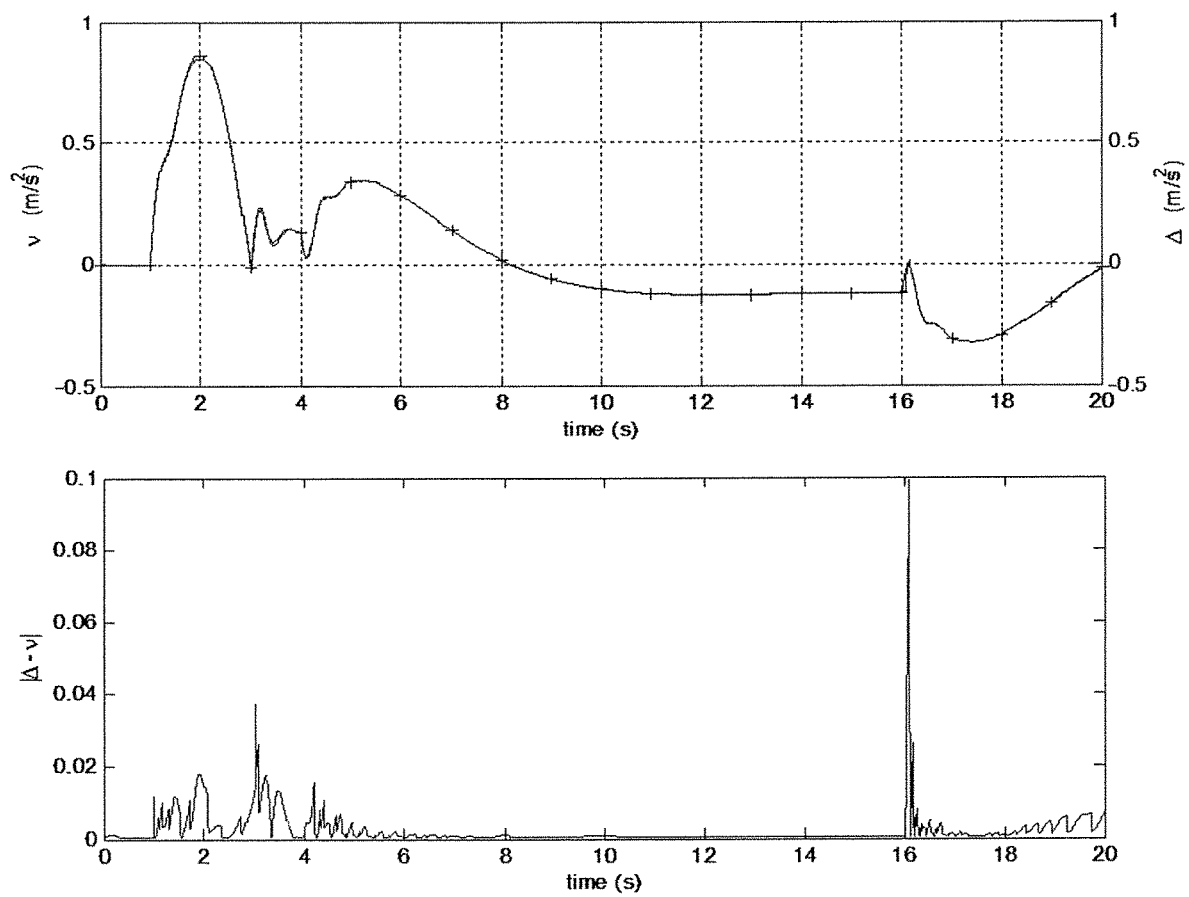
FIG. 7 contains a schematic illustration of graphs showing GP learning the uncertainty between the aircraft dynamics in order to perform feedback linearization associated with AMI-MRAC architecture.

Each aircraft was flown in the same altitude climb maneuver, tasked with following a given path used as the reference model. The simulations detailed in Figures own in the same altitude climb maneuver, tasked with following a given path used as the reference model. The simulations detailed in FIGS. 3 through 6 show each aircraft being flown with a simple PD, feedforward control scheme, and then subsequently, using the GP-MRAC algorithms. In order to perform Rapid Controller Transfer, the marginally tuned controller for the Aerosonde in FIG. 3 is applied directly to the Zaggi in FIG. 5. The controller performance on transfer aircraft is degraded significantly. Without modifying the controller parameters, the feedback linearization is applied using the GP to learn the uncertainty that arises from transfer system in FIG. 6. In FIG. 7, the performance of the GP to model the uncertainty is shown.

Practically speaking, all adaptive control algorithms come at the cost of some kind of computational power. The computational requirements of GP-MRAC according to one embodiment are primarily influenced by the number of kernels used in GP estimates, which is preallocated for online GP methods. In order to provide an estimate of the computational requirements, the GP-MRAC architecture was translated to C++ and implemented on the Flight Control Computer. A subroutine was written that utilized an online GP with KL divergence method to regress. Utilizing 25 kernel centers, the script ran at approximately 10 Hz.

Taking into consideration that the code was running in the context of an operating system and the code was not optimized for run-time, the number of instructions per iteration was approximately, $5*10^6$.

As such, the control laws presented herein verify that a controller can be transferred between fixed-wing aircraft platforms with very little foreknowledge of the system dynamics. The primary benefit would be the potential time and cost savings in developing highly functional UAS. The control law presented fused AMI-MRAC with an online supervised learning technique known as a Gaussian Process for adaptation. The formulation involved adaptation in the outer loop, rather than the inner loop. Simulation results presented in this above demonstrate the ability of this alternative approach to adapt to new airframe dynamics.

Hardware Design

Figure 8:
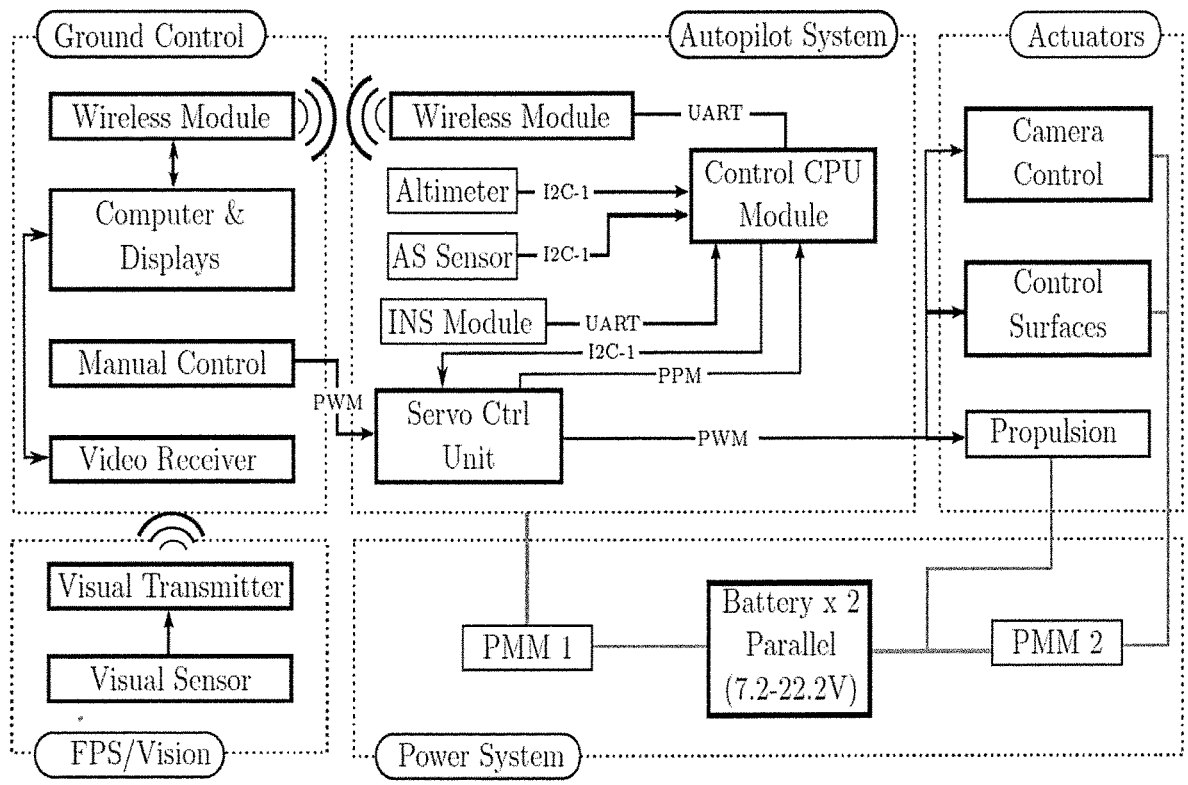
FIG. 8 contains a schematic illustration of an illustration of the autopilot block diagram showing the different components and their communication protocols. The autopilot block diagram shows the different components and their communication protocols. Note that the protocols may be changed depending on the modules used.

A system block diagram of key components was identified and is provided in FIG. 8. The benefits of a modular design are particularly justifiable in those components for which technology advances quickly, or component price differs largely. Thus, the following components were selected to feature modularity: flight control computer, inertial navigation system and wireless ground control communications module. Note these components are identified with the keyword "Module" in FIG. 8.

One must be especially concerned with the form, weight and power consumption of all components in aerospace design. Benchmarking efforts dictated the following requirements for this embodiment of Stabilis.

1. Minimum 750 MHz clock speed with 256 Mb RAM
2. Minimum of 8 servo outputs/inputs, PPM compatibility, and SBus compatibility.
3. Feature RS232, RS485, UART, I²C, SPI, CAN, ethernet, and USB compatibility (with a minimum of 3 serial based connections not including necessary components, i.e. INS, airspeed, and wireless module).
4. Maximum of 80 grams, dimensions not to exceed 3.0×3.0×1.5 inches, and power consumption less than 1 W including flight essential sensors.

Since COTS autopilots span a wide spectrum of capability, the requirements above were provided as generic guidelines for being competitive with the market as it stands. However, those of ordinary skill in the art will be able to design systems that can accommodate new hardware as it becomes available to prevent the system from ever becoming obsolete based on the instant disclosure.

An embodiment uses the Beaglebone black flight control computer that features Sitara AM3359AZCZ100 1 GHz, 2000 MIPS, processor with 512 MB DDR3L 606 MHZ RAM and 2 GB 8 bit EMMC flash on-board storage, all coming in at only 40 grams.

An embodiment of an inertial navigation system uses VectorNav's VN200. Other embodiments could use Epson M-G362, or the KVH 1750.

An embodiment of the wireless communication module might use the XBee 900 RPSMA, 3DR Radio Set, or JDrones jD-RF900. It was found that the JDrones jD-RF900 performed well.

Figure 9:
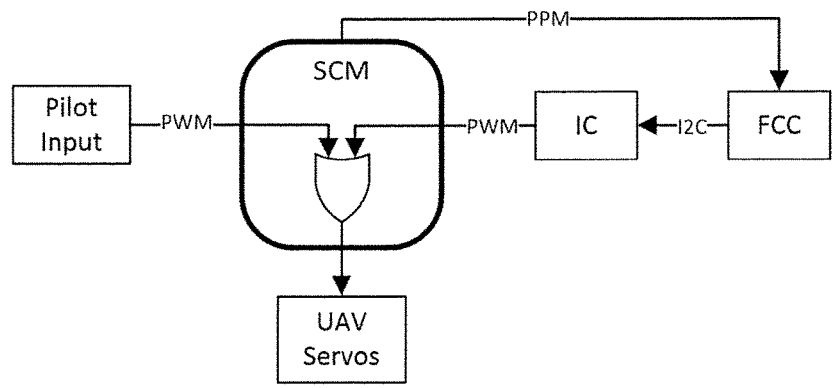
FIG. 9 contains a schematic illustration of a SCM Block Diagram.

An embodiment of a servo control unit is shown in FIG. 9. The pilot input signal to the SCM is given as a PWM signal which is then converted to a PPM signal and sent to the FCC for analysis. The relay of pilot input to the FCC will allow for aircraft stability augmentation and similar control techniques in the future. The FCC control signal, which is produced by the ACS, is then sent back to the SCM. The SCM muxes between the signals based on pilot input, so the pilot ultimately has the control to turn off the ACS as needed.

An embodiment of the systems integration board sensors uses a Honeywell, HSCMRRN001PD2A3, to provide the differential pressure reading of the airspeed sensor. Additionally, the Freescale MPL3115A2 Precision Barometric Altimeter was chosen as a simple, inexpensive option for sensing altitude. The sensor features a resolution of 0.3 meters, with maximum altitude of approximately 8000 meters.

An embodiment of the power management system uses a Castle Creations Battery Eliminator Circuit voltage regulator due to the components small footprint, efficiency and excellent reputation among users. Despite its user-reported reliability, the voltage regulator was intended for RC hobbyist applications, so quality was still a large concern. In order to mitigate issues with quality and robustness, two CCBECs were placed in parallel with a surge and reverse voltage protection circuits. This configuration allows for a single CCBEC to fail open or closed without adverse consequences to the electronics being powered. Note that the CCBEC circuit could be replaced with any voltage regulator with similar specifications. A final configuration allowed for input voltages from 7.4V to 22.2V, with a maximum 10 amps continuous.

Figure 10:
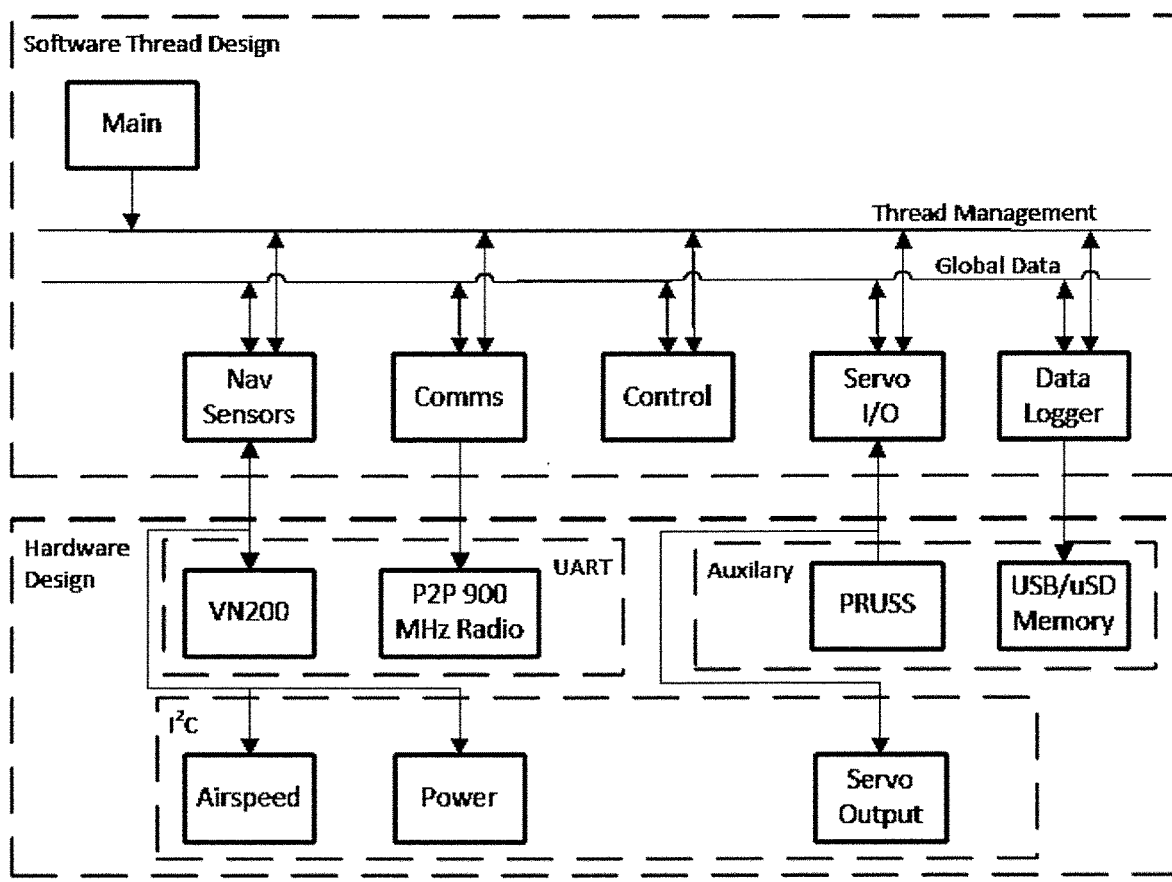
FIG. 10 contains a schematic illustration of a thread design block diagram.
Figure 11A:
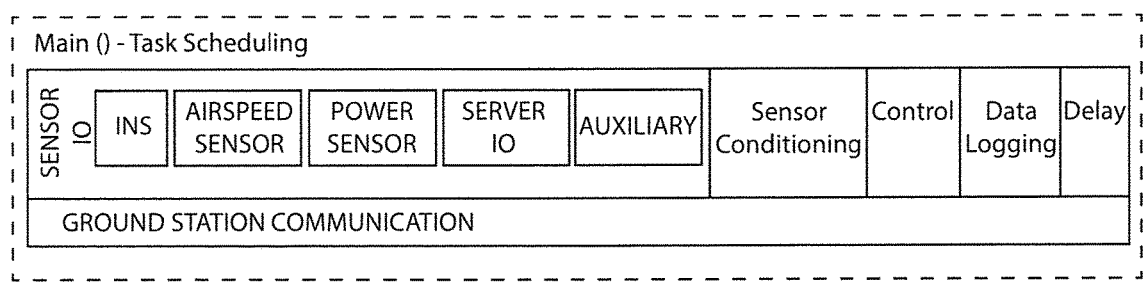
FIG. 11A contains a schematic illustration of task scheduling.
Figure 11B:
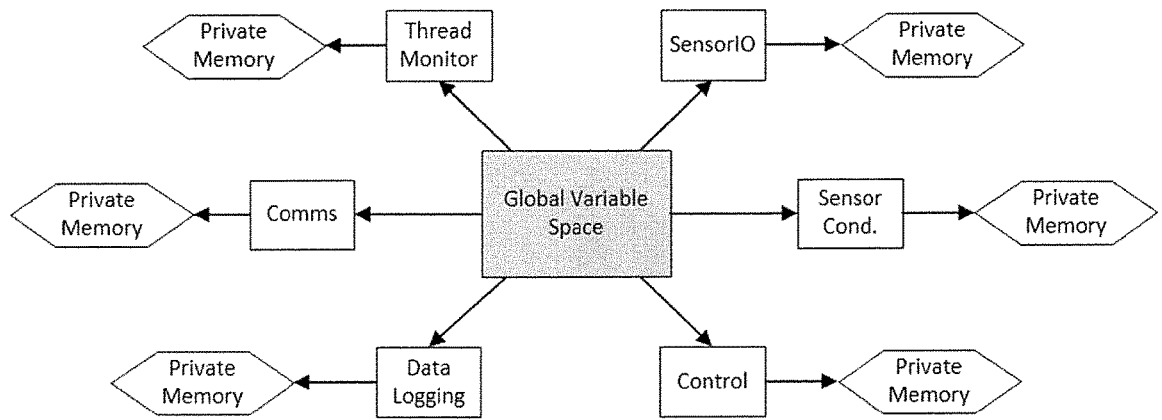
FIG. 11B contains an exemplary diagram of a global variable space suitable for use with embodiment.

An embodiment of the operating system was Ubuntu. FIG. 10 illustrates a thread design block for an embodiment. FIG. 11 contains a schematic illustration of task scheduling according to an embodiment.

Note that for purposes of this document, the term "state" will be used to describe a set of parameters necessary to describe the dynamic motion of a UAV or piloted aircraft.

Note also that for purposes of this disclosure, preferred control parameters include one or more of position (including, for example, latitude, longitude, and altitude, etc.), velocity (including, for example, angular rate, body velocity, etc.), and attitude (including, for example, vehicle orientation, etc.). Selection of other control parameters, including any quantity calculated or associated with any of the foregoing, is well within the ability of one of ordinary skills in the art.

Figure 12:
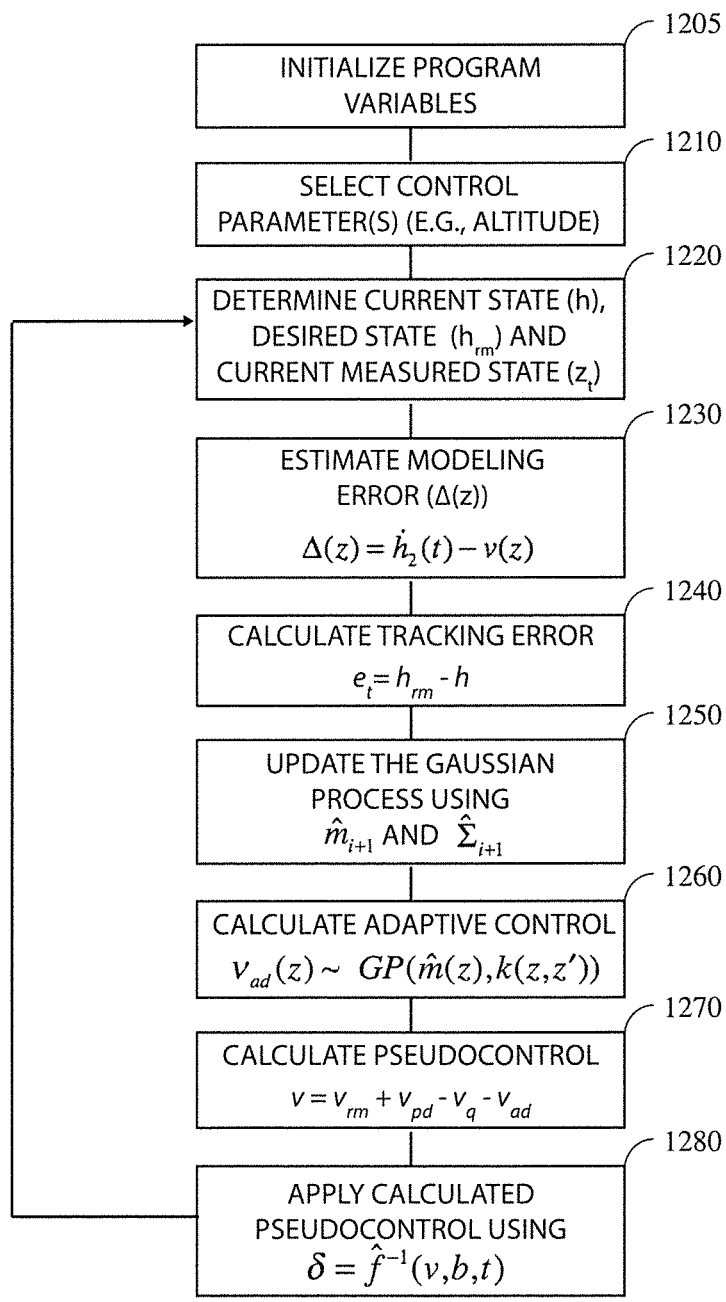
FIG. 12 contains an example of an operating logic suitable for use with an embodiment.

Turning next to FIG. 12, this figure contains an operating logic suitable for use with an embodiment. In that figure, program variables will be initialized as is commonly done according to methods well known to those of ordinary skill in the art (box 1205). In some cases the initial value of the pseudocontrol parameter, v(z), might be set equal to zero. Techniques for initializing variables in iterative schemes are well known.

In addition, one or more control parameters will be selected (box 1210). One example of such would be altitude although other choices are certainly possible. Other choices might include, by way of example and not limitation, altitude, outer and inner loop control, etc. (e.g., FIG. 2). This embodiment is especially useful with nonlinear control variables. Those of ordinary skill in the art will understand how the instant disclosure would need to be modified if other control parameter(s) were chosen instead.

Next, an operational loop (1220-1280) will be entered. In some embodiments the current state (h) and desired state ($h_{rm}$) of the system will be determined (box 1220), where the current measured state is represented by $Z_t = z_1, \ldots, z_t$, (e.g., with respect to the example presented above $z = [\alpha\ \theta\ q\ h^T\ \delta_e]^T$). Note that it should be understood that the variables within the 1220-1280 loop of FIG. 12 (and elsewhere within this document) are for the most part functions of time or any surrogate value of same, although such dependence has been omitted for purposes of clarity in the equations.

The estimated modeling error can then be calculated (box 1230). According to one embodiment the estimated modeling error can be computed as $(\Delta(z)=\dot{h}_2(t)-v(z))$, where $\dot{h}_2(t)$ is the actual acceleration of the aircraft with respect to the ground. The tracking error can then be calculated, i.e., e, (box 1240).

Next, the Gaussian process will be updated (box 1250). In some embodiments, a sparse GP update as that term is known and understood in the art. See, e.g., Chowdhary, G., et. al,"*Bayesian Nonparametric Adaptive Control Using Gaussian Processes*", IEEE Trans Neural Networks and Learning Systems, vol., 26, No. 3, March 2015, the disclosure of which is incorporated herein by reference as if fully set out at this point. For example, the update might be calculated using the equations for $\hat{m}_{t+1}$ and $\hat{\Sigma}_{t+1}$ developed supra. Note that this particular formulation can readily be modified by those of ordinary skill in the art depending on the choice of control parameters, etc.

Next, and according to the present embodiment, the adaptive control $v_{ad}(z)$, will be calculated using a Gaussian process formulation described above (box 1260). In some embodiments, the mean function $\hat{m}(z)$ will be continuously calculated/updated as time advances and the UAV moves. An embodiment of the kernel function has been previously disclosed but those of ordinary skill in the art will recognize that other kernels might be used including, but not limited to, Laplace kernels, periodic kernels, and vector GP kernels. Note that k(z,z') refers to two different instances of the measured state, e.g., $z_t$ at two different times.

Next, the parameter values $v_{rm}$, $v_{pd}$, and $v_q$ will be determined and used along with $v_{ad}(z)$ to calculate the pseudocontrol v (box 1270). In some embodiments, $v_q$ will be the pitch rate. During the first pass, some or all of $v_{rm}$, $v_{pd}$, and $v_q$ might be initially set to zero.

Finally, the calculated pseudocontrol will be applied to the aircraft (box 1280), after which the method may return to box 1220 so that the previous actions may be repeated as needed.

In some embodiments, the pseudocontrol of box 1280 will be applied by calculating $\delta=\hat{f}^{-1}(v,b,t)$, where delta, according to one example, is the required actuator deflection, b is the control allocation matrix, as described previously, and $\hat{f}$ is an approximation to the unknown $f$. This might result, by way of example only, in a control surface actuation such as movement of an elevator, aileron or rudder deflection. Note that the function $f$ will be used herein to represent a generally unknown system dynamic of the subject aircraft for which modeling is sought, i.e., one where the inputs and outputs to the function are known or can be determined but where the general form of the function is not known or knowable. This function will be assumed to be invertible and the parameter $\hat{f}$ will be used herein to represent a function that approximates $f$, i.e., one that is obtained via the methodology disclosed above. Thus, the inverse of the estimate of the system dynamic will yield delta which represents the adjustment to be applied to the control parameters.

Additional information related to this application may be found in the Master of Science thesis of Jacob Stockton entitled "Modular Autopilot Design and Development Featuring Bayesian Non-Parametric Adaptive Control", submitted to the faculty of the Graduate College of Oklahoma State University, December 2014, the disclosure of which is incorporated herein as if fully set out at this point.

* * *

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of controlling a flight of an aircraft comprising the steps of:
   a. selecting at least one control parameter of said aircraft;
   b. in a CPU module, performing steps comprising:
      (i) determining a current state of said aircraft;
      (ii) determining a desired state of said aircraft;
      (iii) using said current state and said desired state to estimate a modeling error;
      (iv) calculating a tracking error;
      (v) using said estimate of modeling error to update a Bayesian Gaussian control process;
      (vi) using said updated Bayesian Gaussian control process to calculate an adaptive control factor;
      (vii) using at least said adaptive control factor to calculate a pseudocontrol parameter for each of said at least one control parameters;
      (viii) calculating a corresponding control surface deflection for each of said at least one pseudocontrol parameters;
      (ix) transmitting a signal representative of said corresponding control surface deflection for each of said at least one pseudocontrol parameters to an actuator; and
      (x) using said actuator to apply each of said corresponding control surface deflections to the aircraft, thereby adjusting each of said at least one control parameters and controlling the flight of the aircraft.

2. The method of claim 1, wherein each of said at least one control parameter is selected from the group consisting of position, velocity, and attitude.

3. The method of claim 1, wherein the step of calculating said adaptive control factor is performed by calculating $v_{ad}$, where $$v_{ad}(z) = GP(\hat{m}(z), k(z,z'))$$

GP is used to indicate a Bayesian Gaussian process, $\hat{m}(z)$ is a mean function of said Gaussian process, and $k(z,z')$ is a kernel function of said Gaussian process.

4. The method according to claim 3, wherein said kernel function $k(z,z')$ is defined by $$k(z, z') = \exp\left(-\frac{\|z, z'\|^2}{2\mu^2}\right)$$

where $\mu$ is a mean of said Gaussian process.

5. The method of claim 1, wherein said aircraft is a fixed wing UAV.

6. The method according to claim 1, wherein step (b)(viii) comprises the step of:
   (1) using at least said adaptive control factor to calculate a pseudocontrol parameter for each of said at least one control parameters using the equation $$v = v_{rm} + v_{pd} - v_q - v_{ad},$$

where
   v is said at least one pseudocontrol parameter,
   $v_{rm}$ is the pseudocontrol parameter for the reference model,
   $v_{pd}$ is the proportional and derivative control gains,
   $v_q$ is a robustifying term, and
   $v_{ad}$ is said adaptive control factor.

7. The method of claim 1, wherein said step (b)(x) comprises the steps of:
   (i1) calculating an adjustment to each of said control parameters at a point in time via the equation $$\delta = \hat{f}^{-1}(v,b,t)$$

where $\delta$ is the adjustment to each of said control parameters,
   b is a control allocation matrix,
   t is said point in time,
   v is the pseudocontrol parameter, and
   $\hat{f}$ is an estimate of a system dynamic for the aircraft; and
   (i2) adjusting each of said at least one control parameters using $\delta$, thereby controlling the flight of the aircraft.

8. The method of claim 1 wherein said desired state of said aircraft is provided by a pilot.

9. The method according to claim 1, wherein step (b) is performed a plurality of times.

10. A method of controlling a flight of an aircraft comprising the steps of:
    a. selecting at least one control parameter of said aircraft;
    b. determining a current state of said aircraft;
    c. determining a desired state of said aircraft;
    d. in a control CPU module, performing the steps comprising:
       (i) using said current state and said desired state to estimate a modeling error;
       (ii) calculating a tracking error;
       (iii) using at least said estimate of said modeling error to update a Bayesian Gaussian control process;
       (iv) using said updated Bayesian Gaussian control process to calculate an adaptive control factor;
       (v) using at least said adaptive control factor to calculate a pseudocontrol parameter for each of said at least one control parameters;
       (vi) using an estimate of an inverse of a system dynamic of said aircraft to obtain adjustments to each of said at least one control parameters; and
       (vii) transmitting a signal representative of said adjustments to each of said at least one control parameters to an actuator; and (e) using said actuator to apply each of said adjustments to each of said at least one control parameters to produce a control surface deflection of the aircraft, thereby controlling the flight of the aircraft.

11. The method of claim 10, wherein the step of calculating said adaptive control factor is performed by calculating $v_{ad}$, where $$v_{ad}(z) = GP(\hat{m}(z), k(z,z')), \text{ and}$$

GP is used to indicate a Bayesian Gaussian process, ($\hat{m}(z)$) is a mean function of said Gaussian process, and $k(z,z')$ is a kernel function of said Gaussian process.

12. The method according to claim 11, wherein said kernel function $k(z,z')$ is defined by $$k(z, z') = \exp\left(-\frac{\|z, z'\|^2}{2\mu^2}\right)$$

where $\mu$ is a mean of said Gaussian process.

13. The method of claim 10, wherein said aircraft is a fixed wing UAV.

14. The method according to claim 10, wherein step (d)(v) comprises the step of:
(h1) using at least said adaptive control factor to calculate a pseudocontrol parameter for each of said at least one control parameters using the equation $$v = v_{rm} + v_{pd} - v_q - v_{ad},$$

where
v is said at least one pseudocontrol parameter,
$v_{rm}$ is the pseudocontrol parameter for the reference model,
$v_{pd}$ is the proportional and derivative control gains,
$v_q$ is a robustifying term, and
$v_{ad}$ is said adaptive control factor.

15. The method of claim 10, wherein said step (i) comprises the steps of:
(i1) calculating an adjustment to each of said control parameters at a point in time via the equation $$\delta = \hat{f}^{-1}(v, b, t)$$

where $\delta$ is the adjustment to each of said control parameters,
b is a control allocation matrix,
t is said point in time,
v is the pseudo control,
$\hat{f}$ is an estimate of a system dynamic for the aircraft, and
$\hat{f}^{-1}$ is said estimate of said inverse of said system dynamic for the aircraft.

16. The method of claim 10 wherein said desired state of said aircraft is provided by a pilot.

17. A system of controlling a flight of an aircraft comprising the steps of:
a. a plurality of aircraft control surfaces;
b. a plurality of actuators, each of said actuators being in mechanical communication with one of said plurality of aircraft control surfaces and operable to apply a control surface deflection;
c. a control CPU, said control CPU being in electrical communication with each of said plurality of actuators, said control CPU directing said control surface deflections,
d. computer memory accessible by said CPU, said memory at least containing programing instructions executable by said CPU to perform the steps comprising:
(i) selecting at least one control parameter of said aircraft;
(ii) determining a current state of said aircraft;
(iii) determining a desired state of said aircraft;
(iv) using said current state and said desired state to estimate a modeling error;
(v) calculating a tracking error;
(vi) using said estimate of modeling error to update a Bayesian Gaussian control process;
(vii) using said updated Bayesian Gaussian control process to calculate an adaptive control factor;
(viii) using at least said adaptive control factor to calculate a pseudocontrol parameter for each of said at least one control parameters;
(ix) applying each of said at least one pseudocontrol parameter to the aircraft by computing a corresponding control surface deflection;
(x) transmitting a signal representative of said computed control surface deflection to one or more of said plurality of actuators, thereby adjusting each of said at least one control parameters and controlling the flight of the aircraft.

* * * * *